United States Patent
Ferlitsch

(10) Patent No.: US 7,143,210 B2
(45) Date of Patent: Nov. 28, 2006

(54) USER-DEFINED PRINTER SELECTION ADMINISTRATION POLICY

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 195 days.

(21) Appl. No.: 10/706,189

(22) Filed: Nov. 12, 2003

(65) Prior Publication Data

US 2005/0102442 A1 May 12, 2005

(51) Int. Cl.
*G06F 3/00* (2006.01)
(52) U.S. Cl. .............................. 710/38; 710/6; 710/16; 709/225; 709/226
(58) Field of Classification Search .................... 710/8, 710/14, 15–19, 62, 38, 40, 6; 711/170; 713/1, 713/2, 100; 709/225, 226
See application file for complete search history.

(56) References Cited

U.S. PATENT DOCUMENTS

| | | | | |
|---|---|---|---|---|
| 5,617,518 | A * | 4/1997 | Kuwamoto et al. | 358/1.15 |
| 6,003,065 | A * | 12/1999 | Yan et al. | 709/201 |
| 6,967,728 | B1 * | 11/2005 | Vidyanand | 358/1.12 |
| 6,975,417 | B1 * | 12/2005 | Hilpl et al. | 358/1.15 |
| 7,046,383 | B1 * | 5/2006 | Ueda et al. | 358/1.15 |
| 2001/0043357 | A1 * | 11/2001 | Owa et al. | 358/1.15 |
| 2002/0138558 | A1 | 9/2002 | Ferlitsch | 700/203 |
| 2003/0002069 | A1 * | 1/2003 | Bhogal et al. | 358/1.15 |
| 2003/0182475 | A1 * | 9/2003 | Gimenez | 710/8 |
| 2003/0231328 | A1 * | 12/2003 | Chapin et al. | 358/1.13 |
| 2004/0184070 | A1 * | 9/2004 | Kiraly et al. | 358/1.15 |

FOREIGN PATENT DOCUMENTS

| | | |
|---|---|---|
| JP | 2001337805 | 5/2000 |
| WO | WO01/31432 | 5/2001 |
| WO | WO02/41133 | 5/2002 |

* cited by examiner

*Primary Examiner*—Kim Huynh
*Assistant Examiner*—Eron Sorrell
(74) *Attorney, Agent, or Firm*—Law Office of Gerald Maliszewski; Gerald Maliszewski

(57) ABSTRACT

A system and method are provided for managing printer selection in a network of connected printers. The method comprises: accepting a print job; determining characteristics of the print job; selecting a printer in response to a programmable administrative policy that cross-references user-defined usage criteria to print job characteristics; and, sending the print job to the selected printer. The administrative policy is programmed to be responsive to print job characteristics such as user identity, client identity, the document processing application sourcing the print job, the document format, media, document complexity, color/BW, rendering, content, job scheduling, and printer capabilities such as stapling, duplex printing, or hole punching.

14 Claims, 11 Drawing Sheets

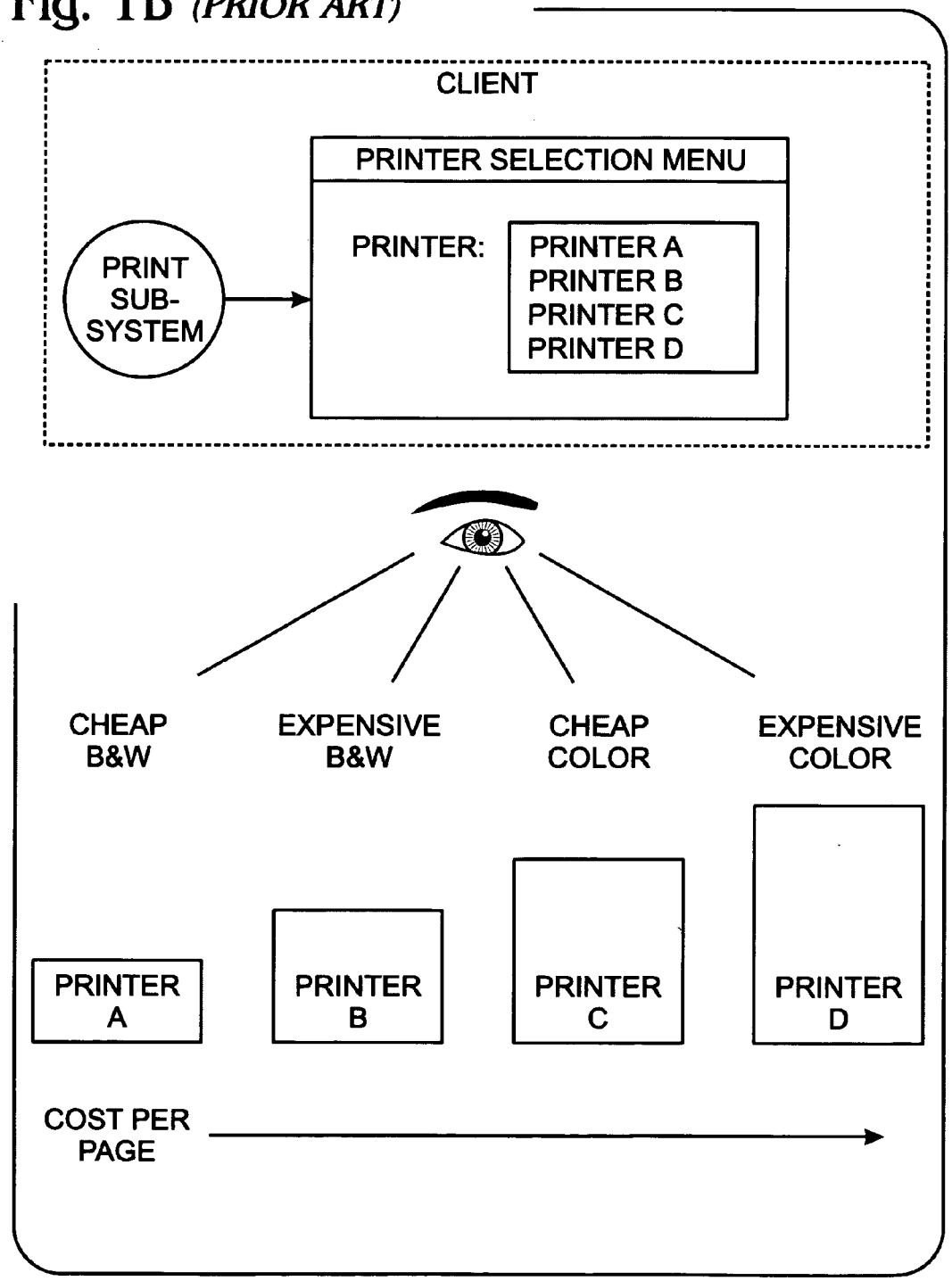
Fig. 1b *(PRIOR ART)*

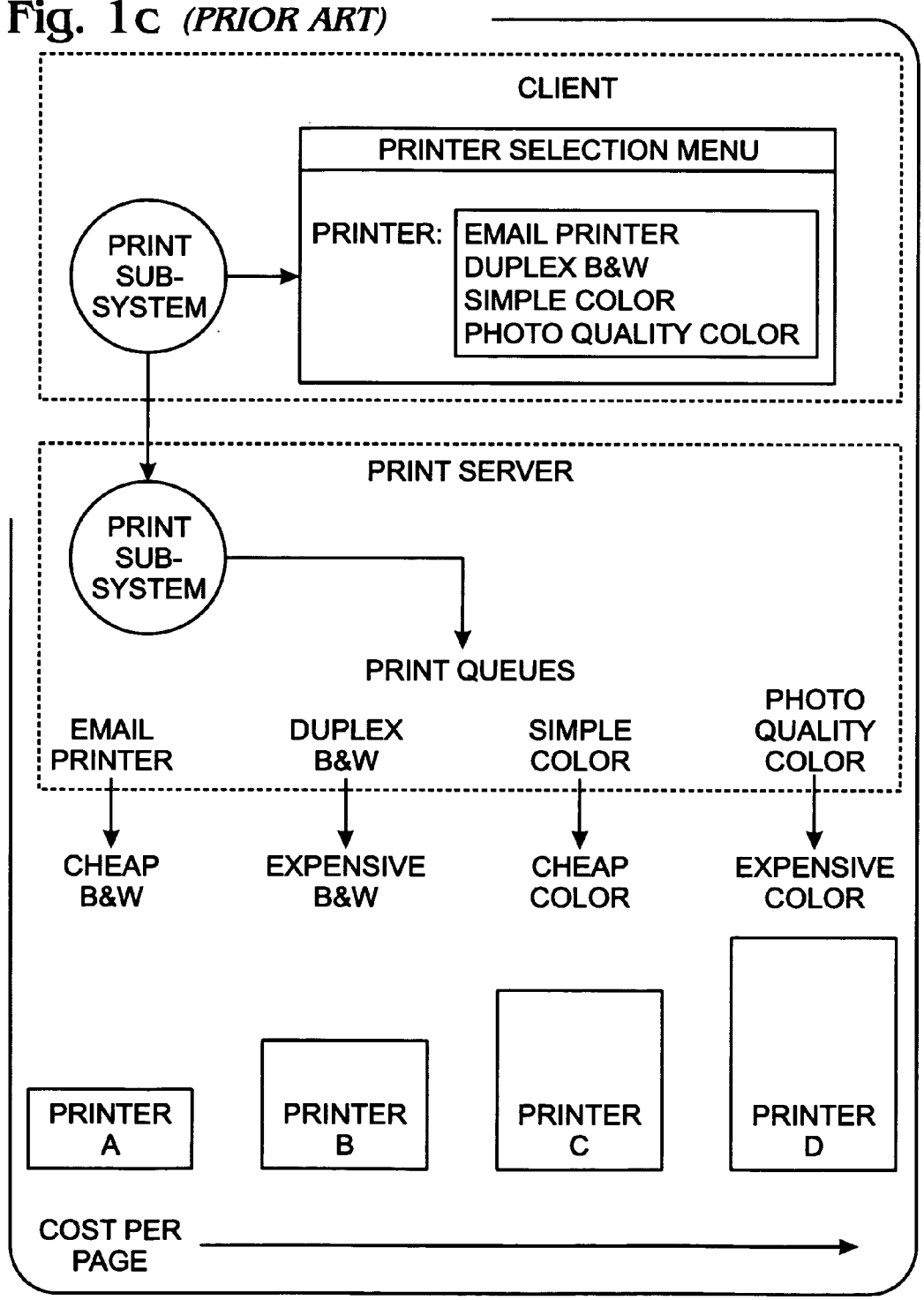
Fig. 1c *(PRIOR ART)*

| PRINTER | PRIMARY | NOTES | SECONDARY |
|---|---|---|---|
| A | USE FOR B&W PRINT JOBS OF MORE THAN 20 PAGES | FAST, RELIABLE PRINTER | PPM = 20 STAPLES, COLLATES |
| B | USE FOR B&W PRINT JOBS OF LESS THAN 20 PAGES, USE FOR EMAIL | SMALL PAPER TRAY, SMALL BUFFER | PPM = 24 |
| ⋮ | | | |
| n | USE FOR EMAIL, B&W PRINT JOBS OF LESS THAN 20 PAGES, SIMPLE COLOR JOBS | PRONE TO JAMMING, INK CARTRIDGES ARE EXPENSIVE | PPM = 24 (BW) 12 (COLOR) |

USER-DEFINED PRINTER SELECTION ADMINISTRATION POLICY

BACKGROUND OF THE INVENTION

1. Field of the Invention

This invention generally relates to digital document printing and, more particularly, to a system and method for a user-defined printer usage administrative policy to select a printer, from a pool of printers, in response to determined print job characteristics.

2. Description of the Related Art

FIG. 1a is a diagram depicting an automated printer selection system (prior art). Conventionally, users and administrators have managed the selection of a printer from a printer pool either manually by the user, or by an automated process using arbitrary criteria. For example, conventional printer pooling software selects a printer based on one or more of the following criteria:

1. Availability—the first printer available to print, so that an idle printer is preferred over a busy printer or a printer reporting an error state. Examples of this kind of software include Microsoft Windows NT/2K® printer pooling and Sharp EZ Cluster® v1.0.

2. Speed—how fast the printer will complete the job, based upon the printer's specification-defined speed. That is, based upon criteria such as a printer's advertised page per minute (ppm) specification. Sharp EZ Cluster® v1.0 is another example of printer pooling software using speed as a selection criteria.

3. Load—the balancing of the load of all pending printer jobs is considered, and new print jobs are assigned so as to maintain an even load distribution for better overall system output performance. Examples of printer pooling software using this selection criterion are Sharp EZ Cluster® v1.0 and Calisto® Cluster Printing.

4. Locality—the printer closest to the user or client device sourcing the print job is selected.

5. Capability—the printer with the best capabilities is selected. As used herein, printer capabilities are printer attributes such as stapling, duplex printing, or resolution (dpi). Again, Sharp EZ Cluster® v1.0 is an example.

The above methods of printer pooling suffer in that:

1. More abstract selection mechanisms cannot be implemented. For example, the above systems cannot select a printer based upon a minimum cost policy.

2. The conventional printer selection systems are driven by printer specifications. For example, if speed is the selection criterion, the printer with the highest ppm specification is chosen, regardless of how fast the printer can actually process a particular print job.

3. The printer usage selection criteria are not programmable. For example, in a system where speed is a primary selection factor, a particular printer with a high ppm, but with a small RAM buffer, cannot be programmed for use with small print jobs only, where buffering is not an issue.

As noted above, conventional pool printing software does not support an administrated, user-defined utilization policy, such as a cost purpose that assigns printers to tasks on the basis of lowering the overall printing costs of the network. For example, an organization may have a pool of four printers, consisting of a cheap (cost of operation) black and white (BW), an expensive BW printer, a cheap color printer, and an expensive color printer. In this example, the organization may dictate a usage policy, such as:

Text only documents, such as email are printed on the cheap BW printer.

BW duplex (two-sided) documents of over 20 pages are printed on the expensive BW printer.

Simple color documents, including colored fonts, are printed on the cheap color printer.

Color photography is printed on the expensive color printer.

FIG. 1b is a diagram depicting a manual printer selection policy (prior art). One method to manage this policy is by voluntary user compliance. That is, each user has the responsibility of manually associating each task to the appropriate printer. The "eye" in the picture represents a user manually selecting a printer on the basis of a perceived policy. This method has many drawbacks:

1. Users may intentionally not follow the policy, and the system may lack any means of policy enforcement.

2. Users may interpret the policy incorrectly.

3. Users may not be informed of the policy or policy changes.

FIG. 1c is a diagram depicting a semi-manual printer selection policy (prior art). In this method some of the above-noted human error issues are addressed with a partial administration of the printer selection process. In one implementation of this method, the administrator sets up print queues in a managed shared printing environment, where the print queues reflect the current selection policy. For example, using the selection policy described in the explanation of FIG. 1b, the print queues are named:

email;

duplex, over_20pages;

non_photo_color; and, photo_quality_color.

Thus, a user can correctly implement the policy by directing the print jobs to the proper print queue. While this method is an improvement over the system of FIG. 1b, it still suffers in that the selection is manual and, therefore, still prone to human error and lack of enforcement.

It would be advantageous if printer pooling selection criteria could be made programmable by the user.

It would be advantageous if printer pooling selection criteria could be made programmable for an individual printer.

It would be advantageous if user-defined printer usage criteria could be defined for a printer pooling selection policy.

SUMMARY OF THE INVENTION

In a printing environment including local, network, and remote multi-functional peripheral devices, the present invention invention manages printer selection based upon user-defined usage criteria. User-defined usage permits a selection policy to be tailored to user needs. For example, user-defined usage permits the policy to be based upon an administrator's personal experience with the network printers, or upon an abstract selection policy based upon minimizing printing costs.

The present invention differs from convention printer pooling software in that:

A printer can be selected automatically from a pool of printers, based on an administrative policy, such as a cost policy.

The criteria for printer selection (the administrative policy) is programmable:

Can be preprogrammed on the client.

Can be preprogrammed on a print server.

Can be programmed on a print server and updated on the fly on the client.

The selection criteria in the administered policy is based upon the information available at print time:
- Application characteristics—the application sourcing the print job.
- Document characteristics, such as the size of document, or the number of pages.
- Client characteristics, such as the user name or client address.
- Job characteristics, such as BW/color or text only.

Accordingly, a method is provided for managing printer selection in a network of connected printers. The method comprises: accepting a print job; determining characteristics of the print job; selecting a printer in response to a programmable administrative policy that cross-references user-defined usage criteria to print job characteristics; and, sending the print job to the selected printer.

In one aspect, the method comprises programming the administrative policy to accept user-defined definitions for the usage of at least one printer in a network of connected printers. In another aspect, the method comprises: accepting a pre-determined matrix cross-referencing specification-defined printer capabilities to print job characteristics, for at least one printer in a network of connected printers; and, modifying the specification-defined printer capabilities with user-defined printer usages, to create the administrative policy.

The administrative policy is programmed to be responsive to print job characteristics such as user identity, client identity, the document processing application sourcing the print job, the document format, media, document complexity, color/BW, rendering, content, job scheduling, and printer capabilities such as stapling, duplex printing, or hole punching.

In the event that a printer cannot be matched to print job characteristics, the administrative policy can be programmed to cancel the print job, create a user interface (UI) to request additional selection criteria, or create a UI for the manual selection of a printer.

In one aspect of the method, the administrative policy is stored in a client-side repository and the printer selection process is initiated in response to a client print subsystem activity such as accepting the print job at a print driver, spooling the print job, despooling the print job, post-processing the print job, or sending the job to the port manager. In another aspect, the administrative policy is distributed and updated from a network server repository.

Additional details of the above-described method, and a system for managing printer selection in a network of connected printers, are provided below.

BRIEF DESCRIPTION OF THE DRAWINGS

FIG. 1b is a diagram depicting a manual printer selection policy (prior art).

FIG. 1c is a diagram depicting a semi-manual printer selection policy (prior art).

FIG. 2c is a schematic diagram illustrating an alternate aspect of the system of FIG. 2a.

DETAILED DESCRIPTION OF THE PREFERRED EMBODIMENTS

Figure 1A:
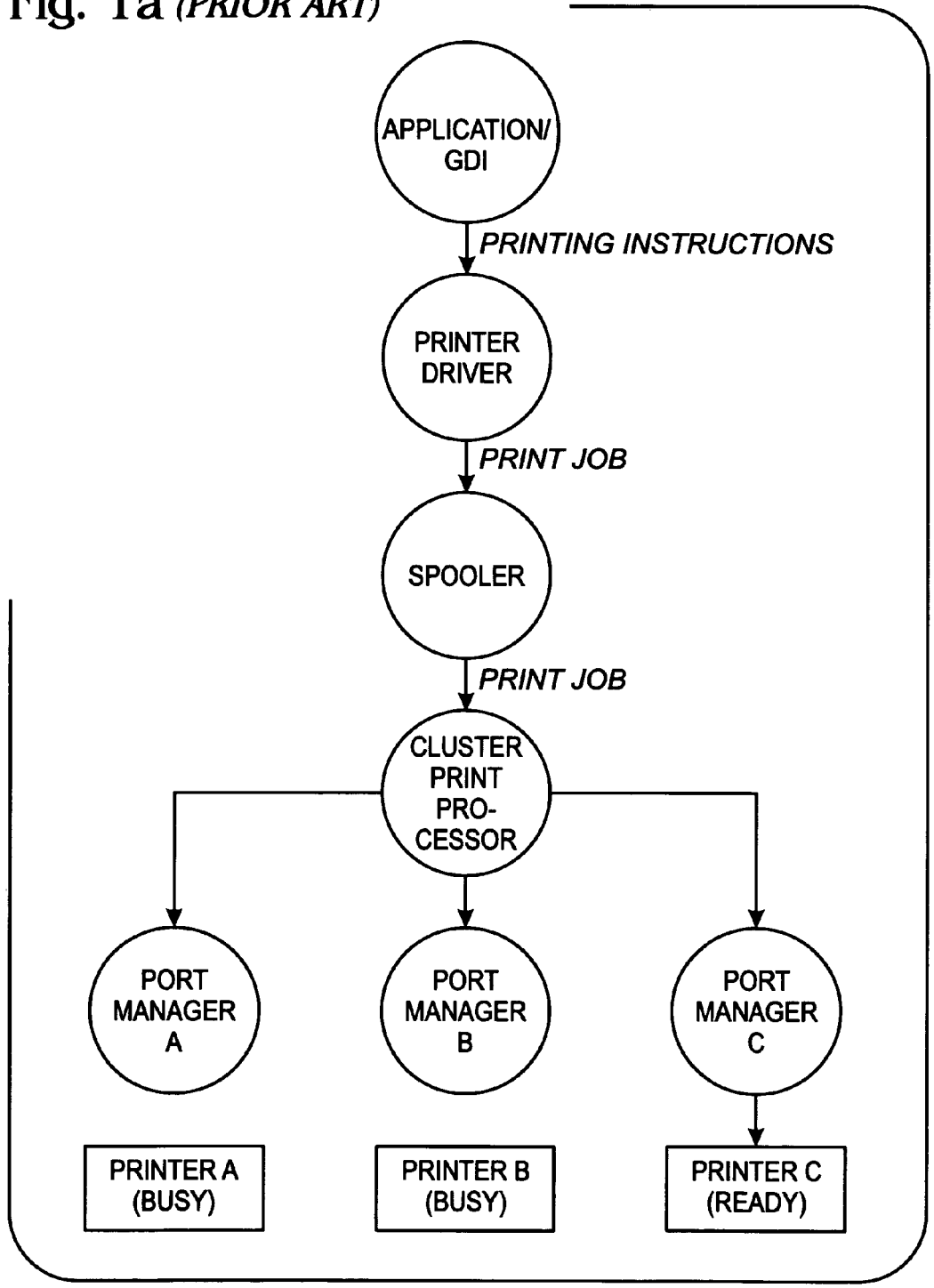
FIG. 1a is a diagram depicting an automated printer selection system (prior art).
Figure 2A:
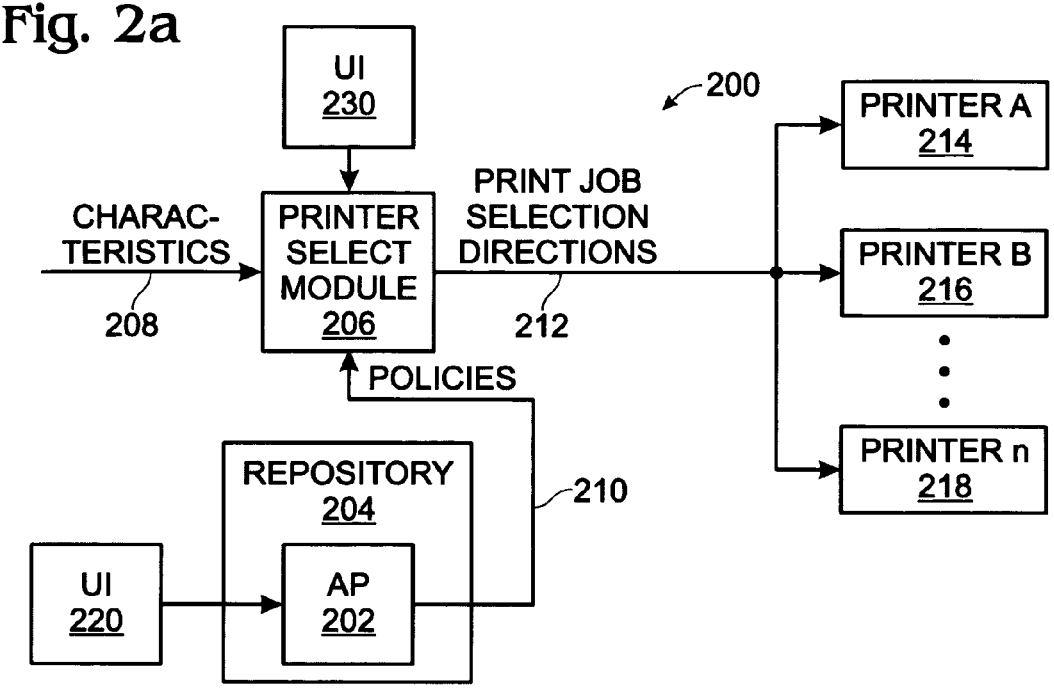
FIG. 2a is a schematic block diagram of the present invention system for managing printer selection in a network of connected printers.

FIG. 2a is a schematic block diagram of the present invention system for managing printer selection in a network of connected printers. The system 200 comprises a programmable administrative policy 202 residing in a memory repository 204. The administrative policy (AP) cross-references user-defined printer usage criteria to print job characteristics. A printer select module 206 has an interface on line 208 to accept determined characteristics for a print job and an interface on line 210 for accessing the administrative policy. Alternately, the printer select module 206 may accept the print job and analyze the print job to determine the print job characteristics. The printer select module 206 has an interface on line 212 to direct the print job to a selected printer. The printer select module 206 can be enabled as a software application with instructions that are acted upon by a processor (not shown). The concept of printer usage is more subtle than a printer selection characteristic such as speed. As such, prior art printer selection software is differentiated from the present invention application, by labeling the present invention application an administrative policy.

The system 200 further comprises a plurality of printers, each having an interface on line 212 that is locally, remotely, or network-connected to the print select module for receiving print jobs. Printer A (214), printer B (216), and printer n (218) are shown, but the system is not limited to any particular number of printers. For simplicity, the administrative policy 202 is shown with a user interface (UI) 220 that is used for programming the administrative policy to accept user-defined definitions for the usage of at least one printer in a network of connected printers. Alternately, the AP 202 may be programmed at another site and loaded into the repository 204. The system is not limited to any particular site for programming the AP 202.

In another aspect, the administrative policy UI 220 can be used for modifying specification-defined printer capabilities with user-defined printer usages. In this aspect, the AP 202 is initially programmed to be responsive to printer specification-defined criteria. Thus, the initial selection policy might select a printer with a high ppm specification for a print job with a large number of pages. However, the initial selection policy can be modified to include user-defined printer usage, to create the present invention AP 202. Thus, the AP 202 may not select a particular printer with a high ppm rate, if the AP has been modified to reflect that the printer is unreliable, and likely to jam when printing a large print job.

Figures 3, 4:
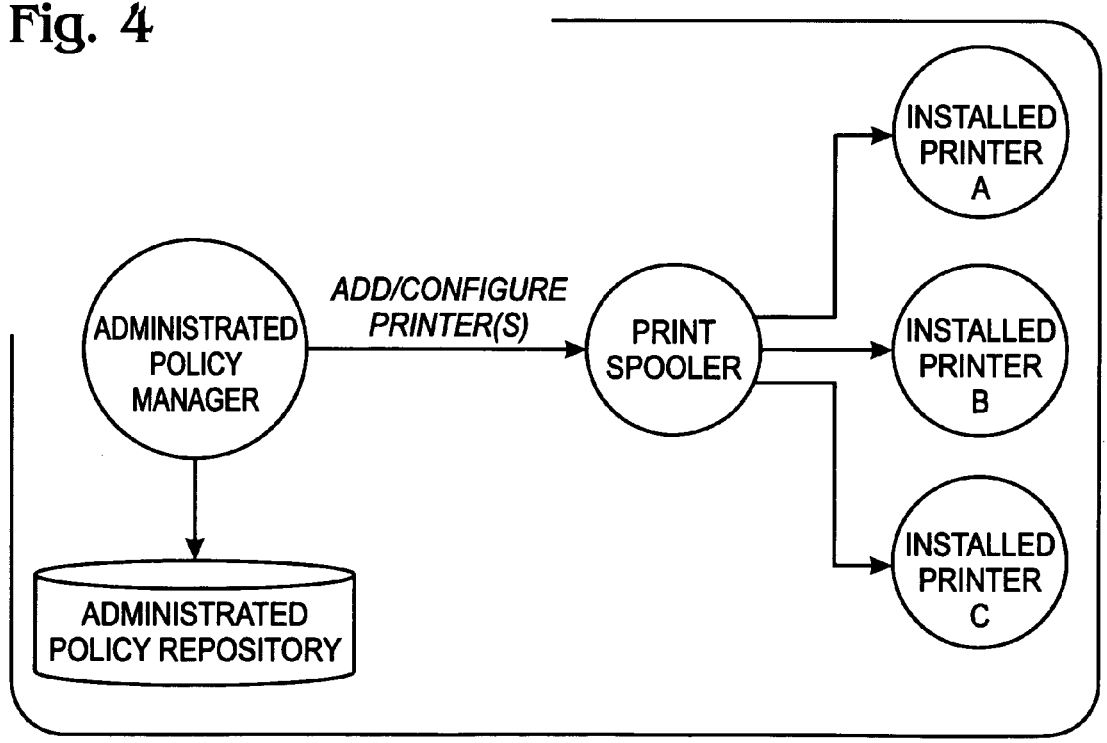
FIG. 3 is a diagram illustrating an exemplary administrative policy, showing some primary and secondary usage criteria, and some user comments justifying the primary usage criteria.
FIG. 4 is a diagram depicting an administrative policy system based upon cost.

FIG. 3 is a diagram illustrating an exemplary administrative policy, showing some primary and secondary usage criteria, and some user comments justifying the primary usage criteria. The following discussion makes reference to both FIG. 2a and FIG. 3. The administrative policy 202, however the usage policy is defined, can be made to be responsive to print job characteristics such as a user identity or a client identity associated with the print job. As used herein, a client is processing device such as a personal computer (PC). Other print job characteristics include the document processing application sourcing the print job or the document format. For example, if the print job is sourced from a document processing application such as Microsoft Word® or Adobe Acrobat®. The media on which the print job is the printed may also be a print job characteristic. For example, the AP 202 may be responsive to the type or grade of paper selected, or paper size, such as A4 or 8.5×11.

The AP 202 can be responsive to the document complexity, meaning characteristics such as the number of pages, page size, or pages per sheet. In addition, the AP 202 may consider characteristics such as whether the document is to be printed in color (or BW), rendering (e.g., resolution), or the content. The content can be text, line art, or images, for example. Further, the AP 202 can be responsive to the job scheduling, such as the time of day at which the document is to be printed, or printer capabilities such as stapling, duplex printing, or hole punching. The above list of print job characteristics is not exhaustive, and the AP 202 may be responsive to other, unnamed characteristics.

In other aspects of the system 200, the administrative policy 202 may secondarily cross-reference print job characteristics to network conditions such as printer availability, printer loading, and/or printer locality (the distance from the print job source to the printer). These are additional factors that cannot be predetermined when the primary criteria are programmed. For example, printer A may be the best choice for a particular job, but a different printer may be selected if the printer A print queue already includes print jobs exceeding some threshold, such as ten (printer availability). The AP 202 may also use specification-defined speed as a selection criterion. For example, if the AP cannot select between available printers based upon the (primary) user-defined usage criteria, then the printer's ppm specifications may be used as a secondary consideration. Further, the printer's specification-defined capabilities may also be used a secondary selection criterion if a decision cannot be upon using the primary criteria.

In some circumstances, the AP 202 may not be able to match a printer to print job characteristics, using either the primary or secondary criteria. Then, the AP 202 prompts an action such as canceling the print job, requesting additional selection criteria, or the manual selection of a printer. The printer select module 206 includes a UI 230 for accepting user commands responsive to the administrative policy action prompts. For example, the UI 230 may be a menu, or set of menus associated with a print driver.

Figure 2C:
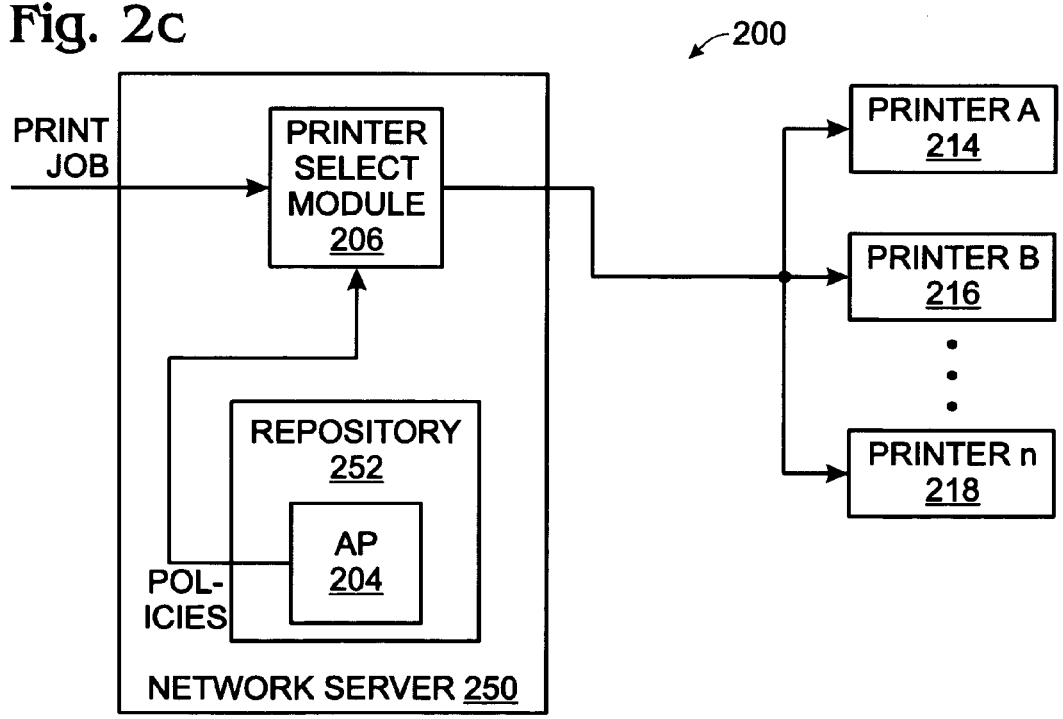
Figure 2B:
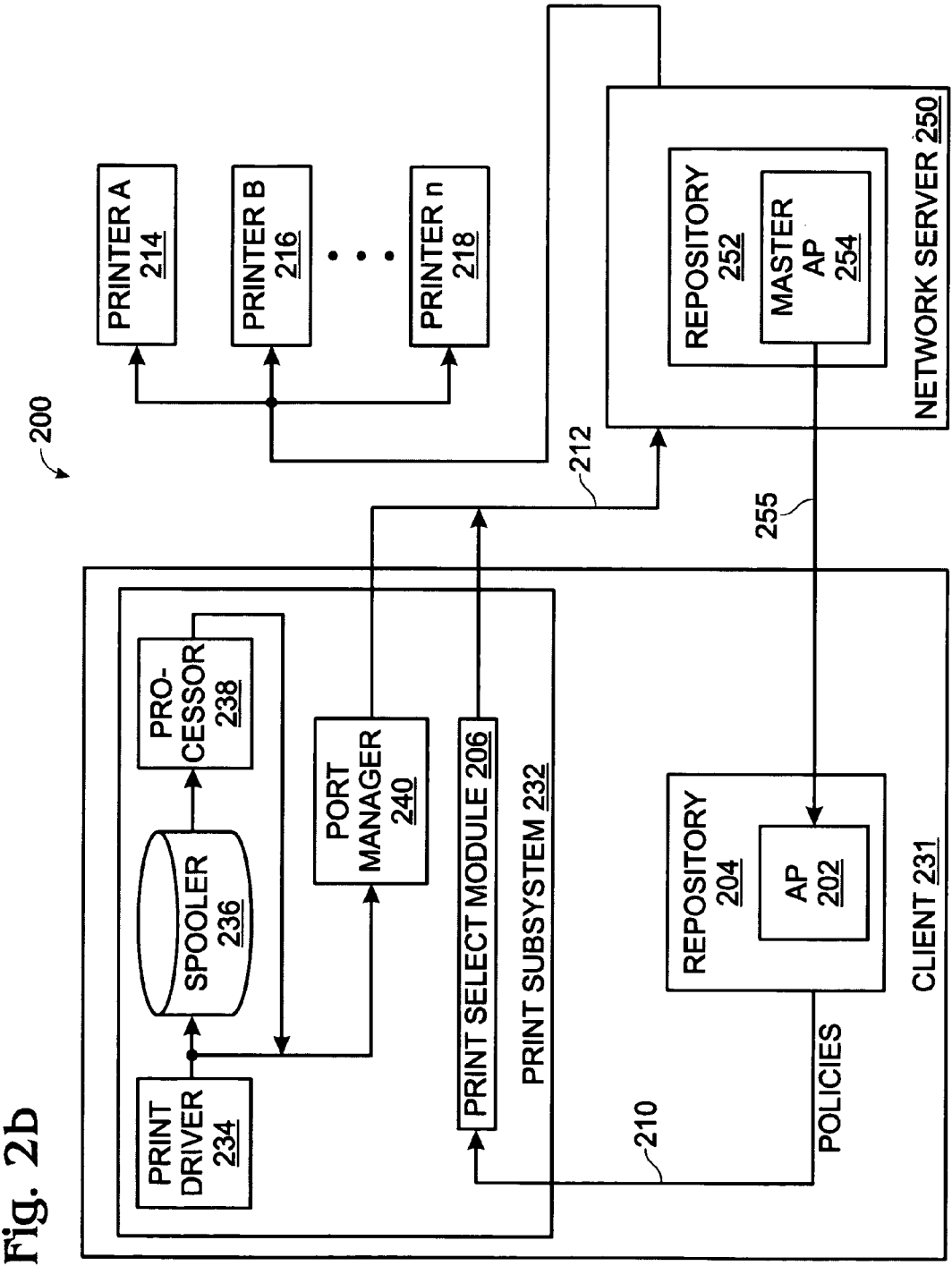
FIG. 2b is a diagram showing the system of FIG. 2a with additional details.

FIG. 2b is a diagram showing the system of FIG. 2a with additional details. As shown, the system 200 includes a client device 231 including a print subsystem 232 with a print driver 234, spooler 236, print processor 238, and port manager 240. As shown, the print select module 206 resides in the client print subsystem and initiates the selection of a printer in response to a print subsystem activity such as accepting the print job at the print driver 234, spooling the print job, despooling the print job, post-processing the print job, or sending the print job to the port manager 240.

More particularly, in some aspects the printer select module 206 initiates the printer selection in response to print driver activity. Then, a printer is selected in response to print job characteristics that can be derived from the print driver 234. For example, the print driver may be able to determine characteristics such as the source application, format of the document, the document complexity (as defined above), content (as defined above), user identity, and/or client identity. Note, the print driver may not be able to determine all possible print job characteristics, such as job scheduling, and the selection is made in response to a limited number of determined characteristics. Further, the print driver may not be able to determine a secondary selection criterion, such as printer availability or printer loading. In other aspects, the print driver 234 is able to determine all print job characteristics that make up the primary selection criteria.

Alternately, the printer select module 206 initiates the printer selection in response to spooler activity (spooling or despooling), and a printer is selected in response to information derived from a print subsystem spooler 236, print processor 238, or port manager 240. The information may be printer availability or printer loading, for example. The activity can also be post-processing activity, or other unnamed activities that are conventionally associated with a print subsystem spooler, print processor, or port manager.

As shown, the administrative policy repository 204 resides with the client 231. However, the AP repository 204 need not necessarily reside with the print subsystem 232. Alternately but not shown, the repository may reside with a peer element or a network server.

One aspect of the system 200 further comprises a network server 250 including a repository 252 with a master administrative policy 254. In this aspect the client repository 204 receives and stores the administrative policy distributed by the network server repository 252 on line 255. The network server repository 252 may also include print drivers and path information for network-connected printers 214–218. Note, the print jobs need not necessarily be delivered through the network server 250 to the printers 214–218, as the network may include other servers (not shown) for this function, or the jobs may be delivered directly to the printers (i.e., peer-peer). The client repository 204 receives and stores the print drivers and path information distributed by the network server repository 252. Then, the client print subsystem 232 can access the client repository 204 for the installation of print drivers and path information. Such a system would be useful if a new printer is added to the network, for example.

Likewise, the network server repository 252 may receive and store administrative policy updates. Then, the client repository 204 receives and stores administrative policy updates distributed by the network server repository 252.

FIG. 2c is a schematic diagram illustrating an alternate aspect of the system of FIG. 2a. Here, the network server 250 has an interface connected to a plurality of printers, such as printers 214 through 218. The printer select module 206 resides in the network server 250 and initiates the selection of a printer in response to accepting determined print job characteristics, or accepting a print job, in which case the printer select module 206 determines the characteristics. For example, the print job may be received from a client PC or another server. Likewise, the administration policy 204 resides in the network server repository 252. Thus, the printer selection policy is carried out at the network server 250. In another aspect not shown, the selection decision is returned to the client that supplied the determined print job characteristics (or print job). In this example, the client is connected to the printers through a peer-to-peer connection, or through a different server (a print server).

FUNCTIONAL DESCRIPTION

As noted above, computing devices that construct and despool an imaging or print job to either an imaging device (printer) or server, are referred to herein as a client-computing device (client). Computing devices that manage a printer, receive print jobs, and respool the print job to/from the printer, are referred to herein as a server-computing device (server). Generally, the invention is described in the context of a print job and printing device, but it need not necessarily limited to just this environment. For example, the invention also applies to scanning, faxing, copying, and document management. Further, the invention is sometimes described in the context of a Microsoft Windows® operating system, but the invention is not limited to any particular operating system. Below, the user-defined printer usage criteria are based upon a cost minimization rationale. However, the usage criteria may be based upon other abstract rationales. Further, the usage criteria may be a result of a general optimization rationale that simply accounts for the peculiarities of particular printers. While the client and server are illustrated as computing devices separate from the imaging devices in the exemplary system, the client and/or server may be embodied within one or more of the imaging devices.

Configuring Printer Pool for Administrated Policy

FIG. 4 is a diagram depicting an administrative policy system based upon cost. In one aspect of the invention, a pool of installed printers is created, either on a client or server computing device. This invention is not dependent upon the installation method. To illustrate the invention, a cost policy manager (printer select module) administers a policy that is applied to the use of each installed printer. For example, the cost policy manager may be an application process with a user interface for the selection of various administrative criteria, such as, but not limited to:

1. BW vs. color printing.
2. Text only printing.
3. Color quality (photographic vs. simple color).
4. Application-specific printing (e.g., MS-Word).
5. Document specific printing (e.g., greater than 20 pages).
6. Client source (e.g., client network address, user name, department).
7. Date & Time (e.g., time of day, evenings vs. day).

The administrative criteria may also be combined with conventional pool printing criteria, such as, but not limited to:

1. Availability (e.g., ready, busy, idle).
2. Locality (e.g., proximity to user).
3. Capabilities (e.g., printer features such as stapling).
4. Load (e.g., balancing the load across the printers)
5. Speed (e.g., time to complete the job).

Once specified, the administrated policy is stored in a repository, such as in a database, registry, or hard drive. The repository may be internal to the computing device or external.

Client Based Printer Selection

Figure 5:
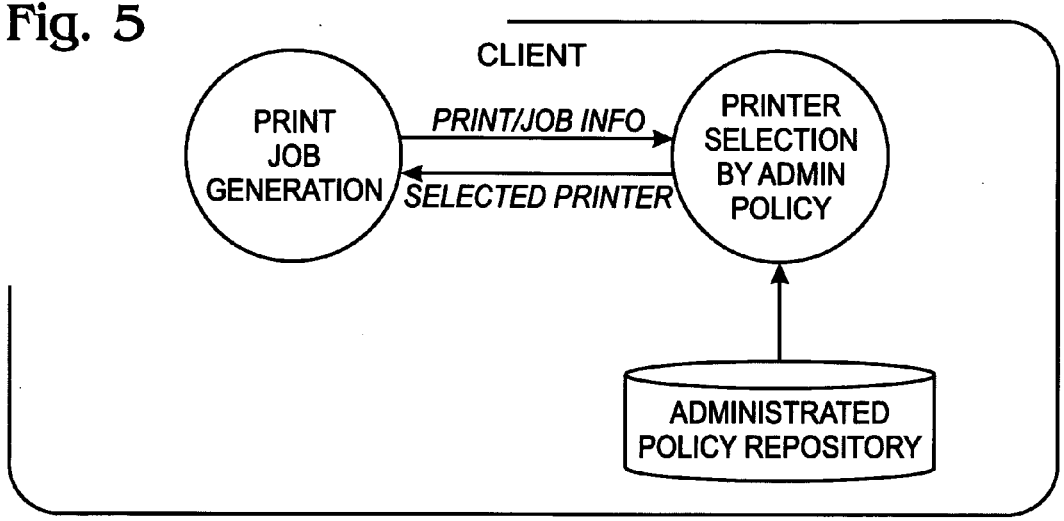
FIG. 5 is a diagram depicting an administrative policy system implemented in a client.

FIG. 5 is a diagram depicting an administrative policy system implemented in a client. In this aspect of the invention, the administered policy printer selection can be implemented in any phase of the printing process, including print job initiation, creation, spooling, or despooling. For example, the administered policy printer selection can be implemented in a printer driver (initiation and creation), spooler (spooling and despooling), print processor (despooling), port manager (despooling), or a print assist, which is any custom component added to the print subsystem between the printer driver and port manager.

The administered policy can be based on any information that is available to the component at the time of selection. For example, the printer driver may have information concerning the initiation of the print job which includes, but is not limited to, the source application, document, and client source information. Other components may, or may not have access to this initiation information, but may uniquely have access to other information. For example, the despooling components may have access to printer availability at the time of print job transmission that can be incorporated with other availability information to further the printer selection process.

The administration policy is retrieved from the AP repository and the available information is applied to the AP to find the best printer match. If no matches are made, the system may take a variety of actions, such as, but not limited to:

1. Canceling the print job.
2. Requesting more information manually to complete the matching process.
3. Requesting manual selection of a printer.

If more than one printer is matched, the system may take a variety of actions, such as, but not limited to:

1. Applying a secondary selection process, such as the most available, locality, load balance, or round robin selection criteria, for example.
2. Requesting manual selection from a subset of matched printers.

Once a printer has been selected, the print job is routed to the selected printer.

Server Based Printer Selection

Figure 6:
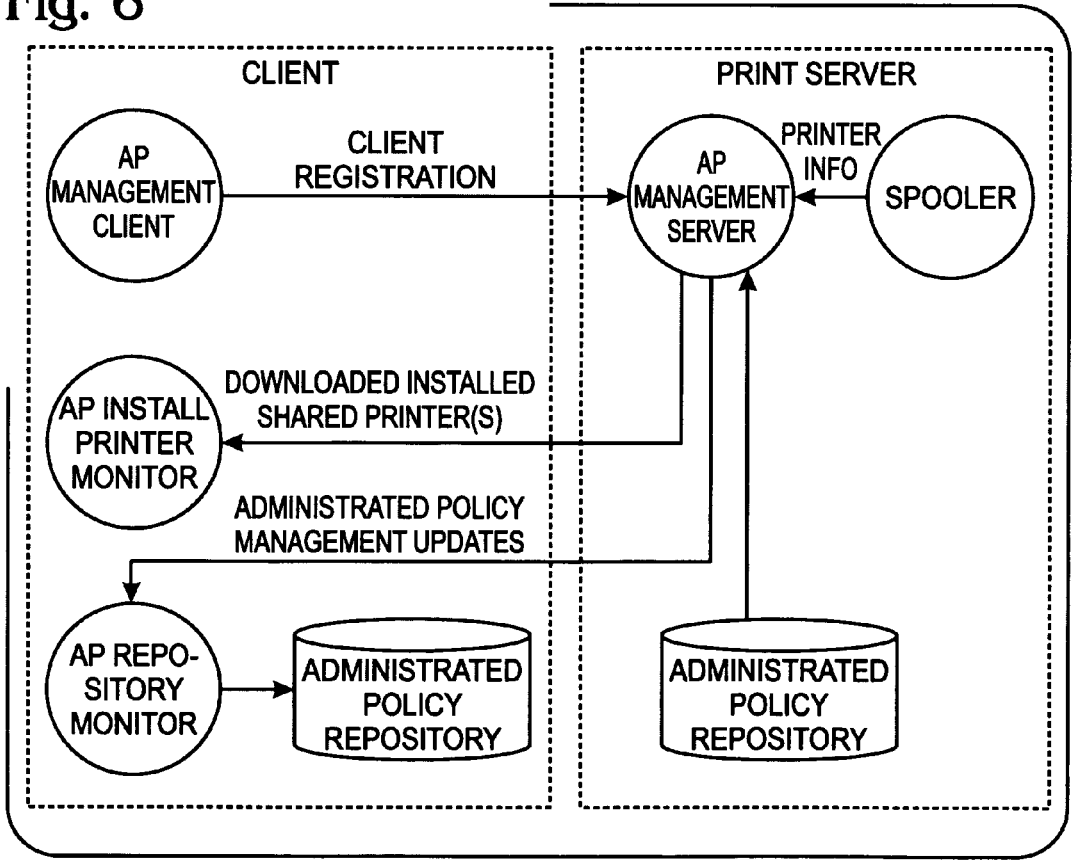
FIG. 6 is a diagram depicting an administrative policy system incorporating a printer server.

FIG. 6 is a diagram depicting an administrative policy system incorporating a printer server. This aspect of the invention can be implemented within a managed shared printing environment, as well as in a client peer-peer printing environment. Examples of a managed shared printing environment include Microsoft Windows® Network Printing and Novell Netware® Network Printing. An administrator installs managed shared printers and configures administrated policies with the associated managed shared printers in the same manner as described for a client-computing device, above.

In this aspect of the invention, both the client(s) and server(s) run software to communicate and manage the administrated policies between the client(s) and server(s), referred to herein as the administrated policy (AP) client and administrated policy (AP) server, respectively. The AP client includes an AP client registration component, an AP network printer installation component, and an AP repository monitor. The AP server includes a component for registering AP clients, and updating installed shared printers and administrated policies on the registered clients.

The AP client registration component registers the client with the AP server by identifying the location of the client for communication purposes. For example, the client's IP address can be used. The AP network printer installation component is an asynchronous background process that waits for installation events from the corresponding component on the AP server. Upon initial registration and at subsequent periodic update periods, the AP server communicates installation information for each current administrated printer on the server. The installation information contains information sufficient for the client to install network printer connections. This information may include, but is not limited to, the associated printer driver for the client's operating system, the network path to the managed printer, and the configuration, if any, of the printing device. Upon receipt, the client examines the installation information for each managed printer. If the managed printer is not already installed, the AP client installs a network connection to the managed printer. If the managed printer is installed, the client determines if changes have been made in the printer driver or configuration. If so, the AP client updates the installation.

In an alternate aspect, the server sends the network address of the printer to the client and the client installs a peer-peer connection. In this embodiment, the server does not manage the print jobs from the client to the printer.

The AP server may periodically update registered clients with changes to the administrated shared printers. These updates may occur as a result of the AP server noting network events, or as a result of periodic polling to detect printer changes.

The AP client repository monitor component is an asynchronous background process that waits for AP repository updates from the corresponding component on the AP server. In this process, the AP server maintains a mirrored (cached) image of the server's AP repository on each registered client. Upon initial registration, the AP server sends a copy of the current AP repository to the AP client monitor. Upon receipt, the AP repository creates, or replaces, a mirror image of the server's AP repository. Afterwards, the AP server sends updates to each client's AP repository monitor whenever a change is made to the server's AP repository. Upon receipt of a repository update, the AP repository monitor updates the client's AP repository.

Example Printer Selection Implementation: Virtual Printer Driver

Figure 7:
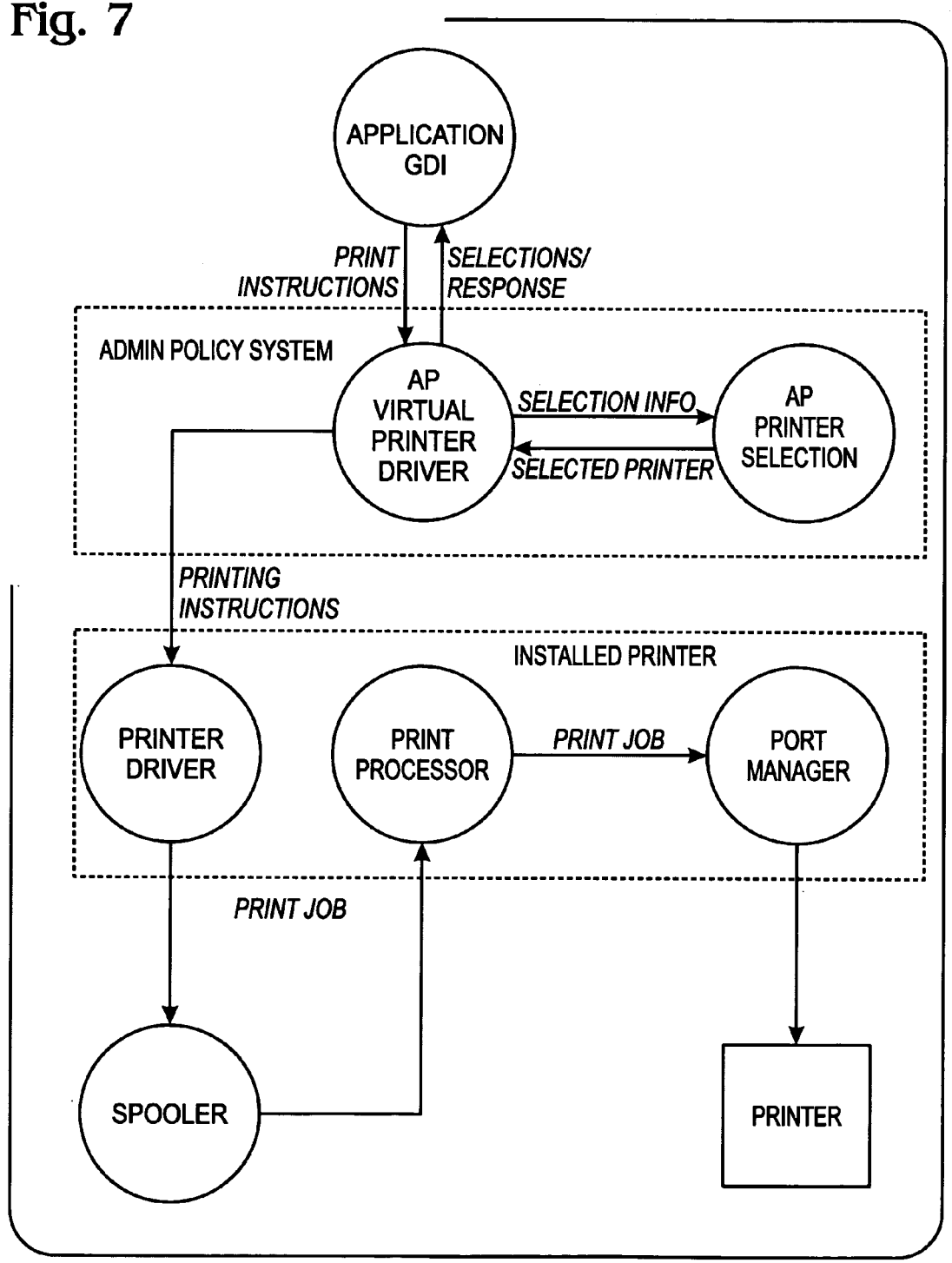
FIG. 7 is a diagram illustrating an administrative policy system implemented with a virtual print driver.

FIG. 7 is a diagram illustrating an administrative policy system implemented with a virtual print driver. In this example, the printer selection method is implemented as part of the printer driver process. The user initiates a print job by selecting an AP printer driver, which is a virtual printer driver. A virtual printer driver VPD is a printer driver that encapsulates multiple installed printers and possibly uninstalled printers. The VPD allows a user or process to select criteria related to the print job without selecting a targeted printer. The VPD then, using any algorithm, matches the criteria to the encapsulated installed printers to select one printer, or more than one in the case of job splitting, and routes the printing instructions to the selected printer.

In this example, the algorithm is the AP printer selection method and the encapsulated installed printers are the AP printer pool. One of the benefits of using a virtual printer driver is that the printing instructions have not yet been converted to a printer specific format. Once converted, the format may not necessarily be compatible with the, later selected, printer. Specifically, if the printer pool consists of highly diverse machines with non-compatible configurations, print languages, and marking engines, the pre-generation of the printer ready data may require substantial conversion to be compatible with the later selected printer.

The virtual printer driver may also enjoy other benefits, such as having access to the entire contents of the job without rendering, such as determining page count, or BW (vs. color), by journaling the printing instructions. Other benefits include having access to information that can be derived at the initiation of the print job, such as the user and source application.

Generally, but not always, the virtual printer driver then passes the printing instructions to the printer driver associated with the selected printer. In other implementations, the VPD may simply change the device context of the printing device within the initiated source (application), and the initiated source passes the printing instructions directly to the printer driver associated with the selected printer.

Example Printer Selection Implementation: EMF Spooling to Print Server

Figure 8:
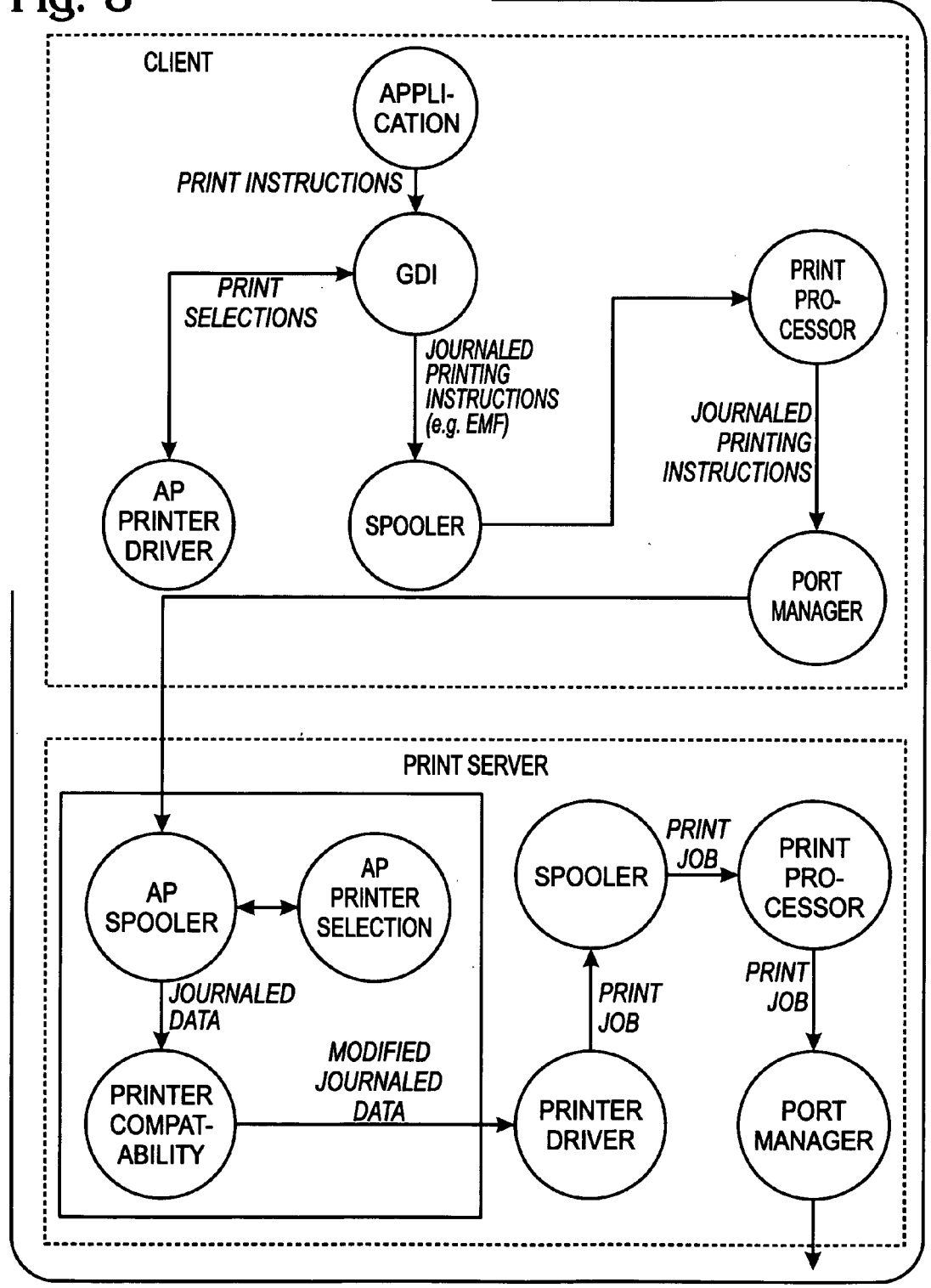
FIG. 8 is a diagram illustrating the administrative policy system implemented where the printing instructions are first journaled, such as with Microsoft Windows® EMF spooling.

FIG. 8 is a diagram illustrating the administrative policy system implemented where the printing instructions are first journaled, such as with Microsoft Windows® EMF spooling. The following describes an exemplary implementation of the printer selection method. In this example, the printer selection method is implemented as part of the despooling playback of a journaled print job either on a client, or on a print server, such as in a managed shared printing environment for Microsoft Windows NT/2K/XP or 2003® Network Printing.

In this method, a print job is initiated by selecting an installed AP printer. The installed AP printer acts as a pseudo printer (not associated with a real physical device). The installed AP printer performs the following functions:

1. Allowing the setting of some set of options common across the printer pool.

2. Passing the selection options in a generic format that is recognizable on the AP server.

3. Instructing the print subsystem to journal the print data as graphics device interface (GDI) data and despool the journaled data to a print processor, and then to the managed printer on the print server, or played back to the associated printer driver on the client.

In this method, the printer selection may occur either on the client or print server. If the printer selection is made on the client, the printer selection method is implemented in the print subsystem, by the associated printer driver or print processor for example, using the client's AP repository. The selected printer information is then passed, with the journaled print job and selected options, to either the print server, or played back to the associated driver on the client.

When the journaled print data is passed to a print server, the print spooler on the print server, either immediately or subsequently, despools the journaled data to the print processor associated with the managed printer. In the case where the AP printer selection occurs on the print server, the associated managed printer is a pseudo printer. The AP printer selection method is then implemented within a component of the pseudo printer. In one implementation, the component is the print processor. In this implementation, the print spooler despools the journaled print data and associated print job options to the pseudo printer's print processor, referred to herein as the AP print processor. The AP print processor then selects a managed shared printer using the AP printer selection method. Once a printer is selected, the AP print processor converts the generic print options to a form that is compatible with the selected printer. In one method, this is accomplished by updating the device independent and device dependent sections of the DEVMODE within the EMF data, using printer-specific information concerning the device dependent section. In another method, the AP print processor creates the print job control instructions (e.g., PJL) using print job control information obtained from a database of the administered printers or associated printer models (e.g., printer model database).

The AP print processor then plays back the journaled data to the printer driver associated with the selected printer. The printer driver then renders the journaled data into printer-ready data compatible with the selected printer and spools the rendered data to the print spooler. Finally, the print spooler despools the rendered print data to the selected printer.

Example Printer Selection Implementation: Despooling

Figure 9:
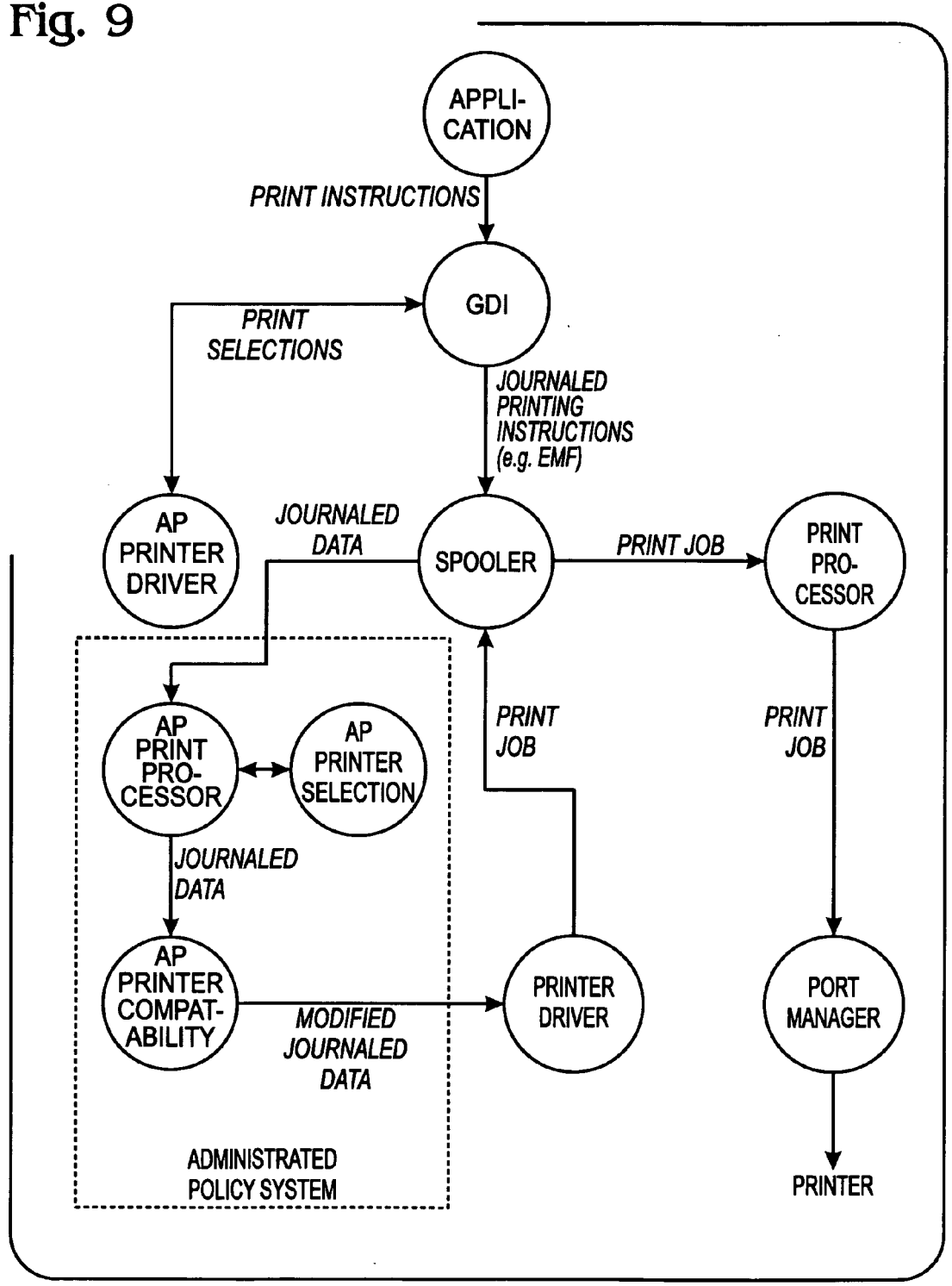
FIG. 9 is a diagram illustrating the administrative policy system implemented as part of the despooling process.

FIG. 9 is a diagram illustrating the administrative policy system implemented as part of the despooling process. In this example, the printer selection method is implemented as part of the despooling of the print job in the client print subsystem, such as in Microsoft Windows® Printing. In this method, a print job is initiated by selecting an installed AP printer. The installed AP printer acts as a pseudo printer (not associated with a real physical device). The installed AP printer performs the functions described above.

The AP printer selection method is implemented by the despooling process associated with the installed AP printer, such as by the print spooler, print processor, port manager, or print assist (where a print assist is any custom component added to the print subsystem between the print spooler and port manager). In one aspect, the AP printer selection is implemented in the print processor associated with the installed AP printer. The AP print driver then spools the print data (either rendered or journaled) to the print spooler. The print spooler then despools the print data to the AP print processor. The AP print processor then selects a printer using the AP printer selection method. Once a printer is selected, the AP print processor converts the print data to a form that is compatible with the selected printer (rendered) or compatible with the printer driver associated with the installed AP printer (journaled). In another aspect, the AP printer selection is implemented in the port monitor associated with the installed AP printer.

Figure 10:
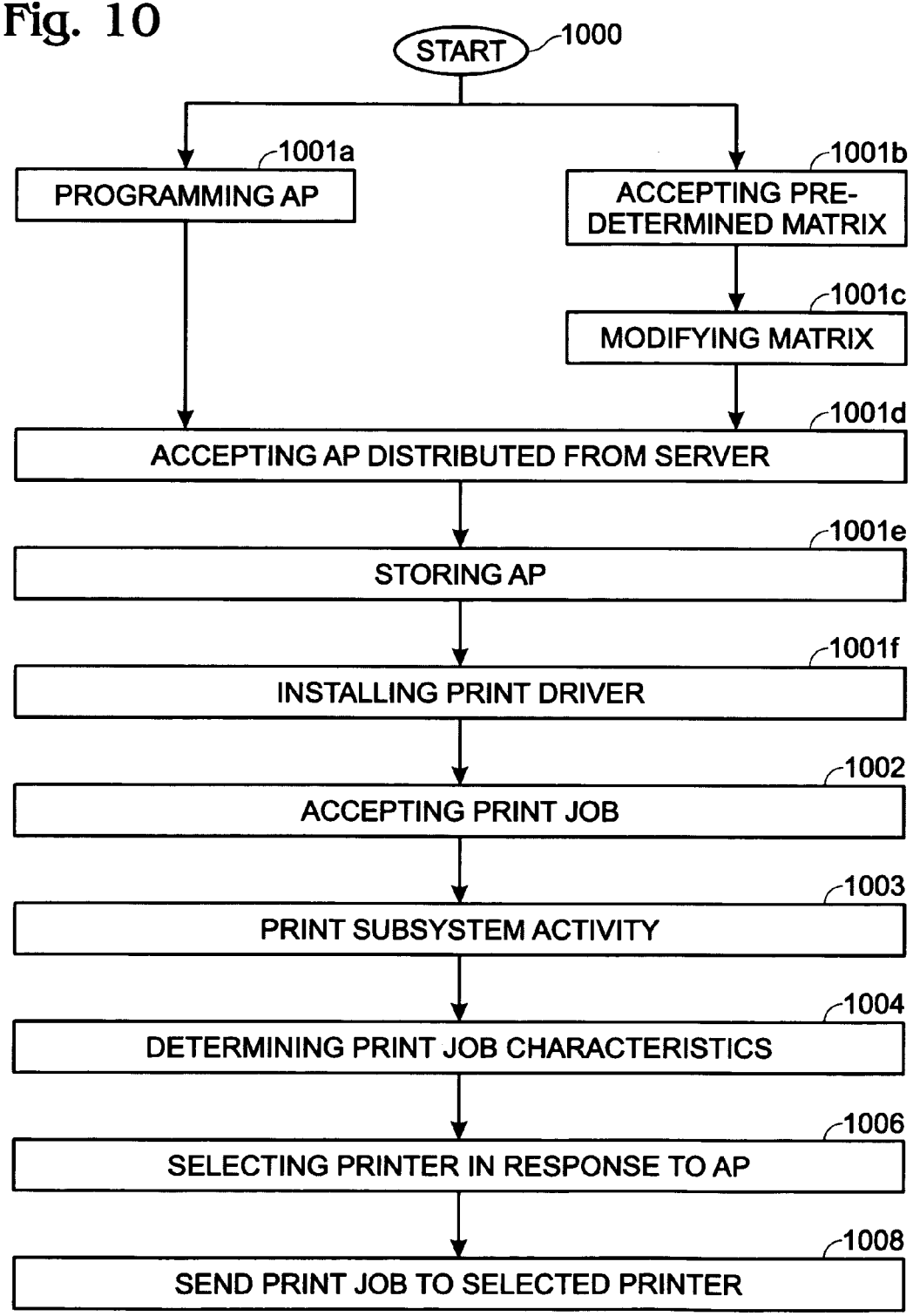
FIG. 10 is a flowchart illustrating the present invention method for managing printer selection in a network of connected printers.

FIG. 10 is a flowchart illustrating the present invention method for managing printer selection in a network of connected printers. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1000.

Step 1002 accepts a print job. Step 1004 determines characteristics of the print job. Step 1006 selects a printer in response to a programmable administrative policy that cross-references user-defined usage criteria to print job characteristics. Step 1008 sends the print job to the selected printer.

In some aspect of the method, Step 1001a programs the administrative policy (AP) to accept user-defined definitions for the usage of at least one printer in a network of connected printers. In one alternately aspect, Step 1001b accepts a pre-determined matrix cross-referencing specification-defined printer capabilities to print job characteristics, for at least one printer in a network of connected printers. Then, Step 1001c modifies the specification-defined printer capabilities with user-defined printer usages, to create the administrative policy.

In one aspect, programming an administrative policy (Step 1001a or 1001c) establishes an administrative policy responsive to print job characteristics described above, including: user identity, client identity, the document processing application sourcing the print job, the document format, media (e.g., type of paper and paper size), document complexity (e.g., number of pages and page size), color/BW, rendering (e.g., resolution), content (e.g., text, line art, or images), job scheduling (e.g., time of day), and/or printer capabilities (e.g., stapling, duplex printing, and hole punching). The invention is not limited to just this list of characteristics.

In other aspects, programming an administrative policy (Step 1001a or 1001c) includes establishing an administrative policy that secondarily cross-references print job characteristics to printer environment conditions. These conditions may include printer availability, printer loading, specification-defined speed, printer capabilities, or printer locality.

In some aspects, programming an administrative policy includes establishing an administrative policy that prompts an action, in response to not matching print job characteristics. The prompted action may include canceling the print job, creating a user interface (UI) to request additional selection criteria, or creating a UI for the manual selection of a printer.

In other aspects, accepting a print job in Step 1002 includes accepting the print job at a client print subsystem. Then, the method further comprises Step 1003. Step 1003 is a print subsystem activity that may include accepting the print job at a print driver, spooling the print job, despooling the print job, post-processing the print job, or sending the job to the port manager. Then, selecting a printer in response to a programmable administrative policy (Step 1006) includes initiating the printer selection in response to a print subsystem activity (Step 1003).

In some aspects, selecting a printer in response to a programmable administrative policy (Step 1006) includes accessing the administrative policy stored in a client-side repository.

In other aspects, the method comprises further steps. Step 1001d accepts the administrative policy, distributed from a network server repository, and Step 1001e stores the administrative policy in a client repository. In one aspect, accepting the administrative policy, distributed from a network server repository in Step 1001d includes accepting administrative policy updates. Then, Step 1001e stores the administrative policy updates.

In some aspects, Step 1001d additionally accepts print driver and path information for a network-connected printer, from the network server repository. Step 1001e additionally stores the print driver and path information in the client repository. Step 1001f installs the print driver and path information in the client print subsystem. Note, the installation process may not occur until after the selection of a printer in Step 1006. In other aspects, the installation may occur as a result of a server-initiated event.

In other aspects of the method, accepting a print job in Step 1004 includes accepting the print job at a network server, and selecting a printer in response to a programmable administrative policy (Step 1006) includes accessing the administrative policy stored in a network server repository in response to receiving the print job at the network server.

A system and method of defining printer selection on the basis of user-defined usage criteria has been presented. Although a cost based usage rationale has been presented to illustrate the invention, other administration policies could be used, such as user/security access for example. The present invention is not limited to any particular rationale.

Although the invention has generally been explained in the context of a Microsoft Windows® operating system, the invention can also be practiced with subsystems of an Apple MacIntosh Operating System, Linux Operating System, System V Unix Operating Systems, BSD Unix Operating Systems, OSF Unix Operating Systems, Sun Solaris Operating Systems, HP/UX Operating Systems, or IBM Mainframe MVS and AS/400 Operating System, to name a limited list of other possibilities. Other variations and embodiments of the invention will occur to those skilled in the art.

I claim:

1. A method for managing printer selection in a network of connected printers, the method comprising:
   changing specification-defined printer capabilities to user-defined printer usages at a user interface, by programming an administrative policy that cross-references user-defined preferences for the usage of network-connected printers, to print job characteristics selected from the group including user identity, client identity, the document processing application sourcing the print job, the document format, media, document complexity, color/BW, rendering, and content;
   accepting a print job at a client print subsystem;
   determining characteristics of the print job;
   accepting an administrative policy, print driver, and path information for a network-connected printer, distributed from a network server repository;
   storing the administrative policy, print driver, and path information in a client repository;
   generating a print subsystem activity selected from the group including accepting the print job at a print driver, spooling the print job, despooling the print job, post-processing the print job, and sending the job to the port manager;
   initiating the selection of printer in response to accessing a print subsystem activity administrative policy stored in a client-side repository, and installing the print driver and path information in the client print subsystem; and,
   sending the print job to the selected printer.

2. The method of claim 1 further comprising:
   accepting a pre-determined matrix cross-referencing specification-defined printer capabilities to print job characteristics, for at least one printer in a network of connected printers.

3. The method of claim 1 wherein programming an administrative policy includes establishing an administrative policy that secondarily cross-references print job characteristics to printer environment conditions selected from the group including printer availability, printer loading, specification-defined speed, printer capabilities, job scheduling, printer capabilities, and printer locality.

4. The method of claim 1 wherein programming an administrative policy includes establishing an administrative policy that prompts an action, in response to not matching print job characteristics, selected from the group including canceling the print job, creating a user interface (UI) to request additional selection criteria, and creating a UI for the manual selection of a printer.

5. The method of claim 1 wherein accepting the administrative policy, distributed from a network server repository, includes accepting administrative policy updates; and,
   wherein storing the administrative policy in a client repository includes storing the administrative policy updates.

6. A system for managing printer selection in a network of connected printers, the system comprising:
   a network server including a repository with a master administrative policy, print driver, and path information for network-connected printers;
   a programmable administrative policy, received from the network server repository and stored in a client memory repository with print driver and path information, with a user interface (UI) to accept user-defined programmable preferences for the usage of network-connected printers, cross-referenced to print job characteristics;
   a client device print subsystem including a print driver, spooler, print processor, and port manager information, accessing the client repository for the installation of print driver and path information; and,
   a printer select module residing in the client print subsystem having an interface to accept determined characteristics for a print job, an interface for accessing the administrative policy, and an interface to direct the print job to a selected printer, and initiate the selection of a printer in response to a print subsystem activity selected from the group including accepting the print job at a print driver, spooling the print job, despooling the print job, post-processing the print job, and sending the print job to the port manager.

7. The system of claim 6 further comprising:
   a plurality of printers, each having an interface, selected from the group including local, remote, and network-connections, to the print select module for receiving print jobs.

8. The system of claim 6 wherein the administrative policy is responsive to print job characteristics selected from the group including user identity, client identity, the document processing application sourcing the print job, the document format, media, document complexity, color/BW, rendering, content, job scheduling, and printer capabilities.

9. The system of claim 6 wherein the administrative policy secondarily cross-references print job characteristics to network conditions selected from the group including printer availability, printer loading, specification-defined speed, printer capabilities, and printer locality.

10. The system of claim 6 wherein the administrative policy prompts an action, in response to not matching print job characteristics, selected from the group including canceling the print job, requesting additional selection criteria, and manual selection of a printer; and,
    wherein the printer select module includes a UI for accepting user commands responsive to the administrative policy action prompts.

11. The system of claim 6 wherein printer select module initiates the printer selection in response to print driver activity, and selects a printer in response to print job characteristics that are determined by the print driver.

12. The system of claim 6 wherein printer select nodule initiates the printer selection in response to spooler activity, and selects a printer in response to information derived from a print subsystem element chosen from the group including the spooler, print processor, and port manager.

13. The system of claim 6 wherein the network saner repository receives and stores administrative policy updates; and,
    wherein the client repository receives and stores administrative policy updates distributed by the network server repository.

14. The system of claim 6 wherein the administrative policy has a UI for modifying specification-defined printer capabilities with user-defined printer usages.

* * * * *

UNITED STATES PATENT AND TRADEMARK OFFICE
CERTIFICATE OF CORRECTION

PATENT NO.        : 7,143,210 B2                                            Page 1 of 1
APPLICATION NO. : 10/706189
DATED             : November 28, 2006
INVENTOR(S)      : Andrew Ferlitsch It is certified that error appears in the above-identified patent and that said Letters Patent is hereby corrected as shown below:

There is an incorrectly spelled word in claim 13. Claim 13 has been printed as follows (the incorrectly spelled word has been emphasized with capital letters):

13. The system of claim 6 wherein the network SANER repository receives and stores administrative policy updates; and.
    wherein the client repository receives and stores administrative policy updates distributed by the network server repository.

The claim should be written as follows:

13. The system of claim 6 wherein the network server repository receives and stores administrative policy updates; and.
    wherein the client repository receives and stores administrative policy updates distributed by the network server repository.

Signed and Sealed this

Sixth Day of February, 2007

JON W. DUDAS
*Director of the United States Patent and Trademark Office*